(12) United States Patent
Albrecht et al.

(10) Patent No.: US 11,728,495 B2
(45) Date of Patent: Aug. 15, 2023

(54) COMBINED COOLING CIRCUIT FOR A FUEL CELL

(71) Applicants: AUDI AG, Ingolstadt (DE); Volkswagen AG, Wolfsburg (DE)

(72) Inventors: Jan-Christoph Albrecht, Wolfsburg (DE); Jan-Philipp Brinkmeier, Braunschweig (DE); Oliver Berger, Braunschweig (DE); Frank Jürgen Engler, Wolfsburg (DE); Carsten Wachsmuth, Schwülper (DE)

(73) Assignees: AUDI AG, Ingolstadt (DE); Volkswagen AG, Wolfsburg (DE)

( * ) Notice: Subject to any disclaimer, the term of this patent is extended or adjusted under 35 U.S.C. 154(b) by 423 days.

(21) Appl. No.: 17/254,087

(22) PCT Filed: Jun. 5, 2019

(86) PCT No.: PCT/EP2019/064640
§ 371 (c)(1),
(2) Date: Dec. 18, 2020

(87) PCT Pub. No.: WO2019/243051
PCT Pub. Date: Dec. 26, 2019

(65) Prior Publication Data
US 2021/0265642 A1 Aug. 26, 2021

(30) Foreign Application Priority Data

Jun. 22, 2018 (DE) ...................... 10 2018 210 190.6

(51) Int. Cl.
*H01M 8/04007* (2016.01)
*B60L 58/33* (2019.01)
*H01M 8/04029* (2016.01)
*H01M 8/04746* (2016.01)

(52) U.S. Cl.
CPC ......... *H01M 8/04059* (2013.01); *B60L 58/33* (2019.02); *H01M 8/04029* (2013.01); *H01M 8/04753* (2013.01); *H01M 2250/20* (2013.01)

(58) Field of Classification Search
CPC ......... H01M 8/04059; H01M 8/04029; H01M 8/04753; H01M 2250/20; B60L 58/33
See application file for complete search history.

(56) References Cited

U.S. PATENT DOCUMENTS 6,370,903 B1 * 4/2002 Wlech ...................... B60L 1/00
62/331
7,600,391 B2 * 10/2009 Naik ..................... B60H 1/3208
62/244

(Continued)

FOREIGN PATENT DOCUMENTS

DE 198 50 829 C1 3/2000
DE 10 2009 045 719 A1 4/2011
(Continued)

OTHER PUBLICATIONS

Machine Translation of DE-102009045719-A1 (Apr. 5, 2023) (Year: 2023).*

*Primary Examiner* — Matthew J Merkling
(74) *Attorney, Agent, or Firm* — Seed IP Law Group LLP

(57) ABSTRACT

A fuel cell system includes a combined cooling circuit for a motor vehicle that provides a method of cooling a fuel cell of a fuel cell system.

7 Claims, 5 Drawing Sheets

(56) References Cited

U.S. PATENT DOCUMENTS

| | | | |
|---|---|---|---|
| 7,823,671 B2 * | 11/2010 | Inoue | H01M 10/615 180/68.5 |
| 2005/0097917 A1 | 5/2005 | Hanada | |
| 2007/0259223 A1 * | 11/2007 | Penev | H01M 8/04059 429/437 |
| 2012/0160581 A1 * | 6/2012 | Hoess | B60H 1/00207 180/68.1 |
| 2017/0149072 A1 * | 5/2017 | Hildreth | H01M 8/04067 |

FOREIGN PATENT DOCUMENTS

| | | | | |
|---|---|---|---|---|
| DE | 102009045719 A1 * | 4/2011 | | B60H 1/00271 |
| DE | 10 2016 114 948 A1 | 2/2018 | | |
| EP | 1 961 592 A1 | 8/2008 | | |
| JP | 2005-514261 A | 5/2005 | | |
| JP | 2018-156790 A | 10/2018 | | |

* cited by examiner

COMBINED COOLING CIRCUIT FOR A FUEL CELL

BACKGROUND

Technical Field

Embodiments of the invention relate to a fuel cell system with a combined cooling circuit for a motor vehicle and a method of cooling the fuel cell of a fuel cell system.

Description of the Related Art

Fuel cell vehicles produce a quantity of waste heat in the cooling water, which for similar power performance corresponds to that of a vehicle driven by an internal combustion engine. Since the temperature level of the fuel cell, being around 80-85° C., is distinctly lower than that of the cooling circuit of the combustion engine, at around 120° C., the problem exists of dissipating the waste heat of the fuel cell when outside temperatures are high.

Furthermore, there is a demand at present to employ different media for the cooling of the fuel cell and for the air conditioning of the vehicle. This means that multiple coolers, hoses, and pumps are present in the vehicle, which brings drawbacks in terms of design space, costs, and weight.

Cooling systems for fuel cell vehicles have already been described, which increase the cooling power by the combination of a cooler and a high-temperature heat pump.

Thus, an air conditioning system for a motor vehicle is known from EP 1 961 592 A1. The motor vehicle comprises a fuel cell with a cooling circuit, which is connected to a heat pump refrigerating circuit, the two circuits having a common condenser as well as an evaporator.

A cooling and heating circuit for a vehicle is found in DE 198 50 829 C1. A fuel cell cooling circuit of the vehicle is connected across a heat exchanger to a heat pump circuit, having a condenser and an evaporator DE 10 2016 114 948 A1 discloses a device for temperature control of a fuel cell stack and a motor vehicle with such a device. The fuel cell stack comprises a cooling circuit, which is connected across a heat exchanger to a refrigerating circuit, which is connected across a cooler/condenser to a heat pump circuit.

Given this background, embodiments of the invention provide a device and a method with which the cooling of the fuel cell is further improved, especially at high outside temperatures.

BRIEF SUMMARY

In some embodiments, a combined cooling and refrigerating system is used for the fuel cell cooling in the vehicle. The cooling of the fuel cell occurs by a refrigerant which is evaporated at least partly, i.e., at operating points with high temperature and waste heat, in the at least one fuel cell and gives up the heat to the outside air at a condenser or cooler. After this, the liquid refrigerant returns to the fuel cell, where it takes up heat. In order to increase the efficiency, this cooling circuit is coupled by a chiller to the refrigerant circuit of a heat pump.

A fuel cell system has at least one fuel cell, which is connected to a first refrigerant circuit, comprising a refrigerant pump, a condenser, and the condenser of a heat exchanger (chiller) comprising a condenser and an evaporator. The first refrigerant circuit is coupled by the evaporator of the chiller to a second refrigerant circuit, comprising a compressor, a condenser, and an expansion valve. The fuel cell system is adapted to evaporate the refrigerant of the first refrigerant circuit at least partly in the at least one fuel cell. The waste heat and temperatures of the fuel cell are subject to great fluctuation, depending on the demanded electric power which is delivered. At operating points (pressure and temperature in the at least one fuel cell) with high temperature and waste heat in the at least one fuel cell of the fuel cell system, the refrigerant in the fuel cell evaporates. Due to the evaporation enthalpy, the heat dissipation from the fuel cell and thus the cooling performance is increased. At operating points with low temperature and waste heat, the waste heat being dissipated is not sufficient to evaporate the refrigerant. This is then pumped in the circuit only in liquid form. The fuel cell system is designed so that it can be operated evaporatively.

Operating points with high temperature and waste heat in the at least one fuel cell, where the refrigerant in the fuel cell is at least partly evaporated, generally occur when the fuel cell is being operated in a range of 30% to 100%, especially 50% to 100%, of its nominal maximum power.

The fuel cell system comprises at least one fuel cell. Generally, the fuel cell is formed by means of many membrane/electrode units arranged in a stack, the electric powers of which add up in an operation of the fuel cell.

In one embodiment of the fuel cell system, a fluorohydrocarbon is used as the refrigerant, especially R1234yf or R1233zb. In another embodiment, a hydrocarbon is used as the refrigerant, especially propane, propene, n-butane, iso-butane, n-pentane, iso-pentane or mixtures thereof.

The fuel cell system comprises a first refrigerant circuit and a second refrigerant circuit, each of them having a condenser. In one embodiment, the first refrigerant circuit and the second refrigerant circuit have a common condenser. That is, only a single condenser is present in the system, which is used in common by the refrigerant circuits of the system. In this way, one condenser is spared, resulting in savings for design space, costs and weight.

In this variant, an optimal temperature difference can be adjusted for the fuel cell by the refrigerant pump, through the volume flow; in the present state of the art, this is around 12 K. The volume flow will increase or decrease, depending on the cooling power demand. With increasing load requirement, the heat dissipation may no longer be sufficient with the temperature level of the fuel cell. In this case, the compressor is used for further cooling of the liquid refrigerant downstream from the condenser, evaporating a partial mass flow of the refrigerant in the second refrigerant circuit in the chiller, and thus cooling down the other partial mass flow which is flowing in the first refrigerant circuit from the condenser to the fuel cell. In this way, the condenser can be operated at a higher temperature level than would be possible for the cooling of the fuel cell.

In one embodiment, the fuel cell system further comprises a third refrigerant circuit, having an expansion valve, an evaporator for air conditioning of the vehicle (interior evaporator), and a compressor, being likewise connected to the common condenser. In this way, no separate condenser is needed for the third refrigerant circuit.

In a further embodiment, the second refrigerant circuit and the third refrigerant circuit have a common compressor. The heat exchanger of the second refrigerant circuit and the evaporator of the third refrigerant circuit are connected to the suction side of the compressor. The compressor works at an intermediate pressure level. With this variant, one compressor can be spared in the overall system.

The third refrigerant circuit comprises an evaporator for cooling the interior. In place of the one evaporator, multiple evaporators are also conceivable, for example one for a rear evaporator system or a battery cooling, This evaporator should be operated at a lower pressure level than the evaporator for cooling the fuel cell, so that the cooling of the fuel cell occurs with a higher suction pressure and a greater efficiency, corresponding to the higher temperature level.

In another embodiment, the chiller of the first refrigerant circuit and the evaporator of the third refrigerant circuit have a common suction line to the compressor. In this variant, the cooling of the fuel cell and the interior occur at the same pressure level, This variant uses a more simple compressor, at the price of efficiency, and thus offers a cost advantage.

In one embodiment of the fuel cell system, the condenser or condensers are cooled by an air flow. In one embodiment, the condenser is situated at the front end of the vehicle and is cooled by the air flow moving against the vehicle.

In one embodiment of the fuel cell system, the same refrigerant flows in all the refrigerant circuits. All the refrigerant circuits of the system are connected to each other, so that hoses and other components can be spared. The use of a single refrigerant in place of multiple different refrigerants further simplifies the operation and the maintenance of the system.

In one embodiment of the fuel cell system, the at least one fuel cell comprises a secondary circuit filled with deionized water and having a heat exchanger (chiller). The chiller is coupled to the first refrigerant circuit and the refrigerant of the first refrigerant circuit is at least partly evaporated in the chiller. In this variant, there is no direct cooling of the fuel cell with the refrigerant, but rather the fuel cell is cooled by a secondary circuit. The cooling circuit with the refrigerant withdraws the heat from a second chiller in the first refrigerant circuit, such as a plate-type heat exchanger. The second chiller is likewise part of a cooling circuit of the fuel cell (the secondary circuit). The advantage of this variant is the very small cooling circuit with deionized water, which can easily be maintained ion-free.

In one embodiment of the fuel cell system, the heat exchanger (chiller) is a plate-type heat exchanger.

A further subject matter is also a method for cooling a fuel cell system comprising at least one fuel cell and at least one first refrigerant circuit, wherein a refrigerant circulating in the first refrigerant circuit is delivered through the at least one fuel cell and is at least partly evaporated therein, i.e., at operating points with high temperature and waste heat in the fuel cell.

The cooling of the circulating refrigerant occurs in one embodiment by direct cooling. In one embodiment, the cooling of the refrigerant occurs at the common condenser, optionally supplemented by cooling through evaporation of a partial flow of the refrigerant in a chiller, by which the partial refrigerant flow taken to the fuel cell is further cooled. In another embodiment, a partial flow of the refrigerant is evaporated in an evaporator (such as a rear evaporator, an evaporator for cooling the interior).

In another embodiment, the cooling of the at least one fuel cell occurs by indirect cooling through a secondary circuit with refrigerant, which is led through the fuel cell. A primary circuit generates the cooling power, while the heat transfer between secondary circuit and primary circuit occurs by means of a plate-type heat exchanger.

The fuel cell system and the method offer the benefit of an improved cooling performance of the vehicle, with no increase or with slight increase in the number of components in the front end of the vehicle.

Further benefits and embodiments emerge from the description and the accompanying drawings.

It is to be understood that the above mentioned and the following features yet to be explained may be used not only in the particular combination indicated, but also in other combinations or standing alone.

BRIEF DESCRIPTION OF THE SEVERAL VIEWS OF THE DRAWINGS

Embodiments of the invention are further described with reference to the drawings.

DETAILED DESCRIPTION

Figure 1:
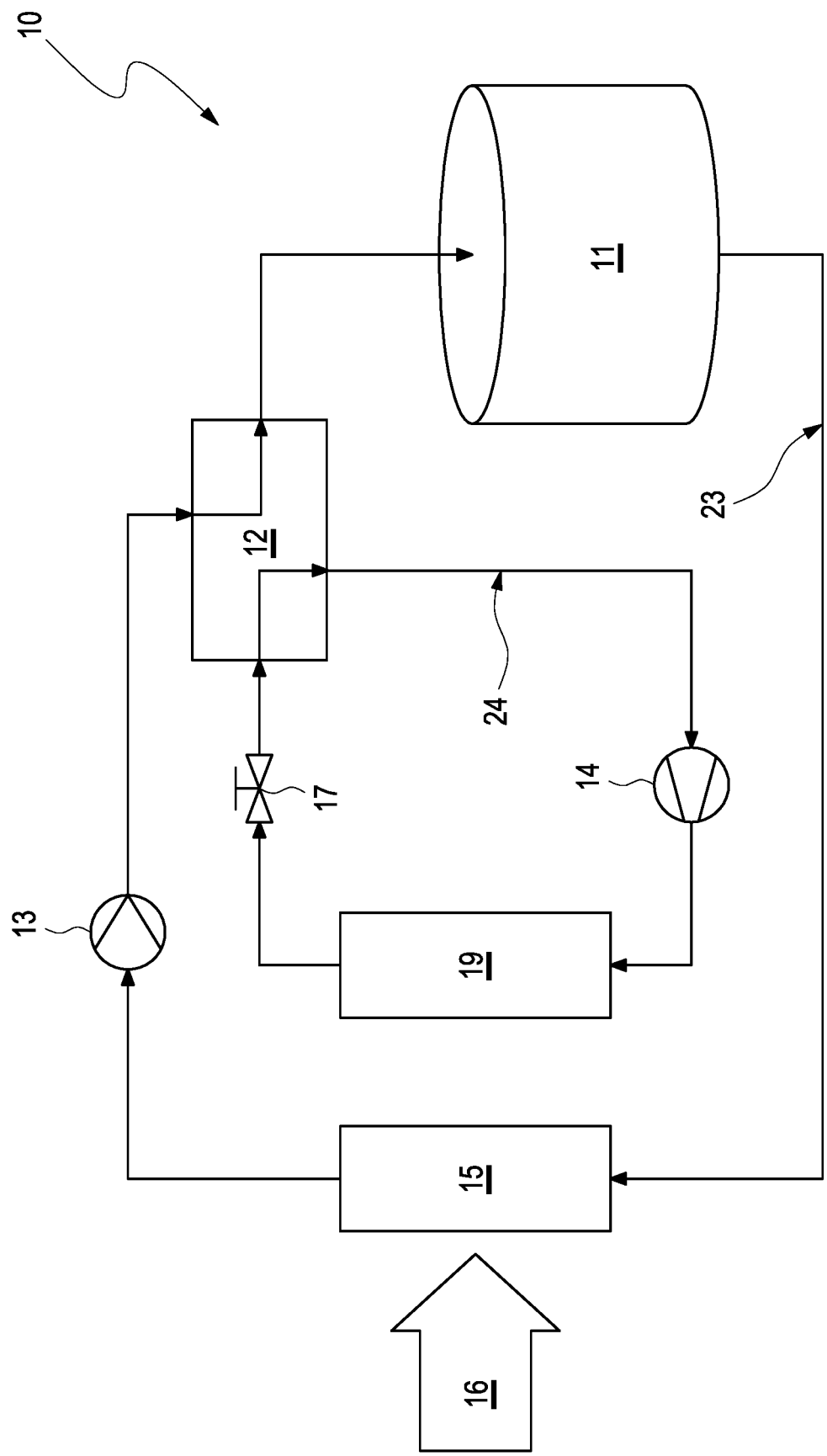
FIG. 1 illustrates a schematic representation of one embodiment of a fuel cell system.

FIG. 1 shows in a schematic representation one embodiment of a fuel cell system 10. The system 10 comprises a fuel cell 11, which may also comprise one or more fuel cell stacks. The fuel cell 11 is connected to a refrigerant circuit 23, in which a refrigerant for the fuel cell 11 circulates. In the refrigerant circuit 23 there are a refrigerant pump 13 and a cooler/condenser 15, exposed to an air flow 16, for adjusting the temperature of the refrigerant flow. The refrigerant circuit is coupled by a heat exchanger (chiller) 12 comprising an evaporator and a condenser to a heat pump circuit 24, in which a refrigerant circulates. The refrigerant evaporates in the chiller 12 and takes up heat. It is compressed in the compressor 14 and taken to a condenser 19, in which it is liquefied, giving up heat. The refrigerant is then expanded in an expansion valve 17. Both of the coolers 15 and 19 are arranged in the front end of the vehicle and are subjected to the air flow 16 for the heat dissipation.

Figure 2:
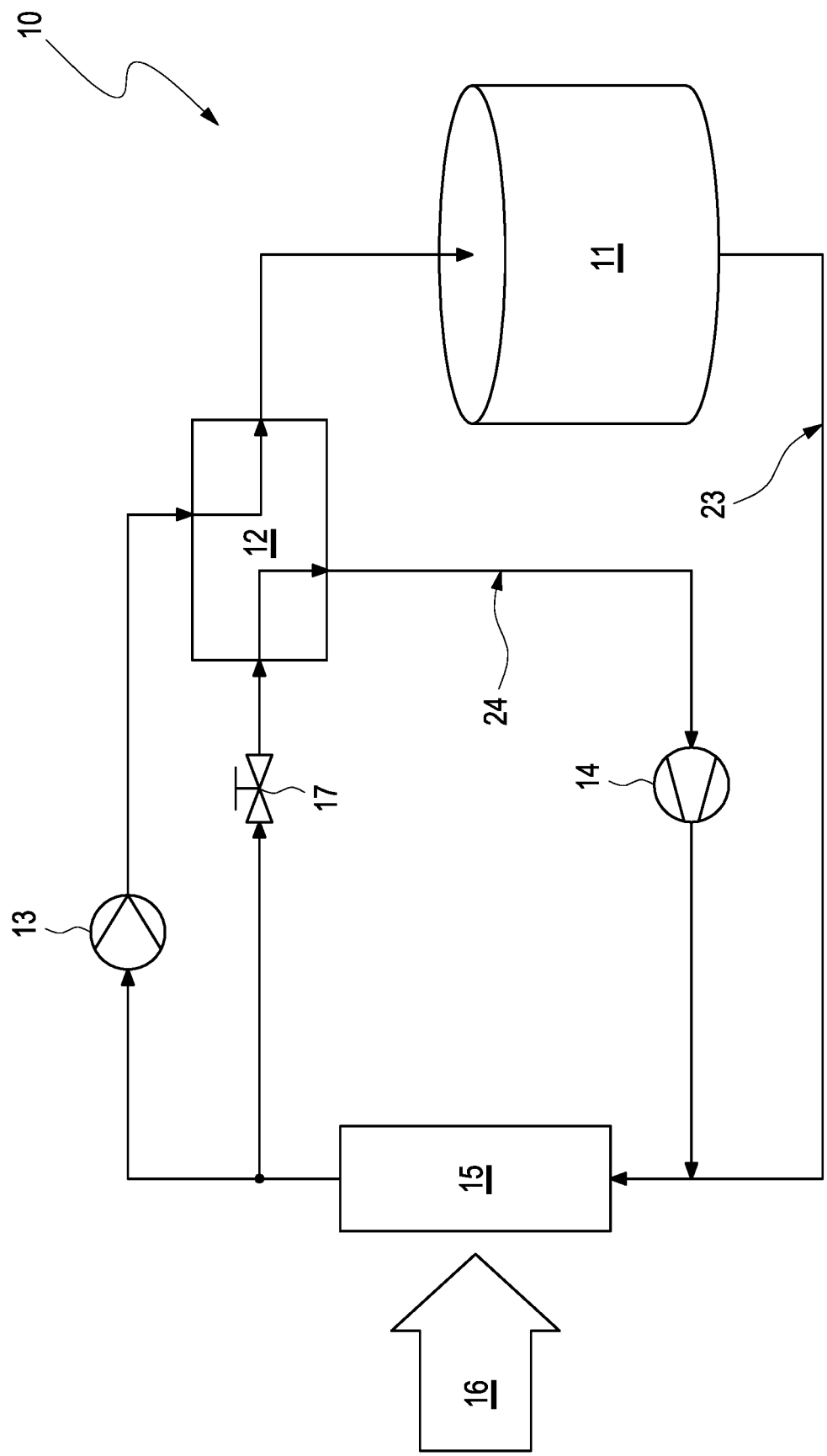
FIG. 2 illustrates a schematic representation of another embodiment of a fuel cell system.

FIG. 2 shows in a schematic representation another embodiment of the fuel cell system 10. In this embodiment, by using a single refrigerant as the cooling medium for the fuel cell 11, the second cooler 19 required in the variant represented in FIG. 1 in the front end can be omitted. A common cooler 15 is used for the cooling of the fuel cell and the heat dissipation of the heat pump. Given sufficient cooling power of the pure circulatory cooling of the liquid refrigerant, an operation analogous to a present-day water cooling can occur. The pump 13 can be used to adjust an optimal temperature difference for the fuel cell 11 through the volume flow in the circulation 23, being in the present state of the art around 12 K. The volume flow in the circulation 23 will increase or decrease according to the demand for cooling power. With increasing load demand, the heat dissipation may no longer be sufficient with the temperature level of the fuel cell 11. In this case, the compressor 14 can be used for further cooling of the liquid refrigerant downstream from the cooler 15, by taking a partial mass flow of the refrigerant to the heat pump circuit 24 and evaporating it in the chiller 12, thus cooling down the other partial mass flow which is flowing from the cooler 15 to the fuel cell 11. In this way, the cooler 15 can be operated at a higher temperature level than would be possible for the cooling the fuel cell 11.

Figure 3:
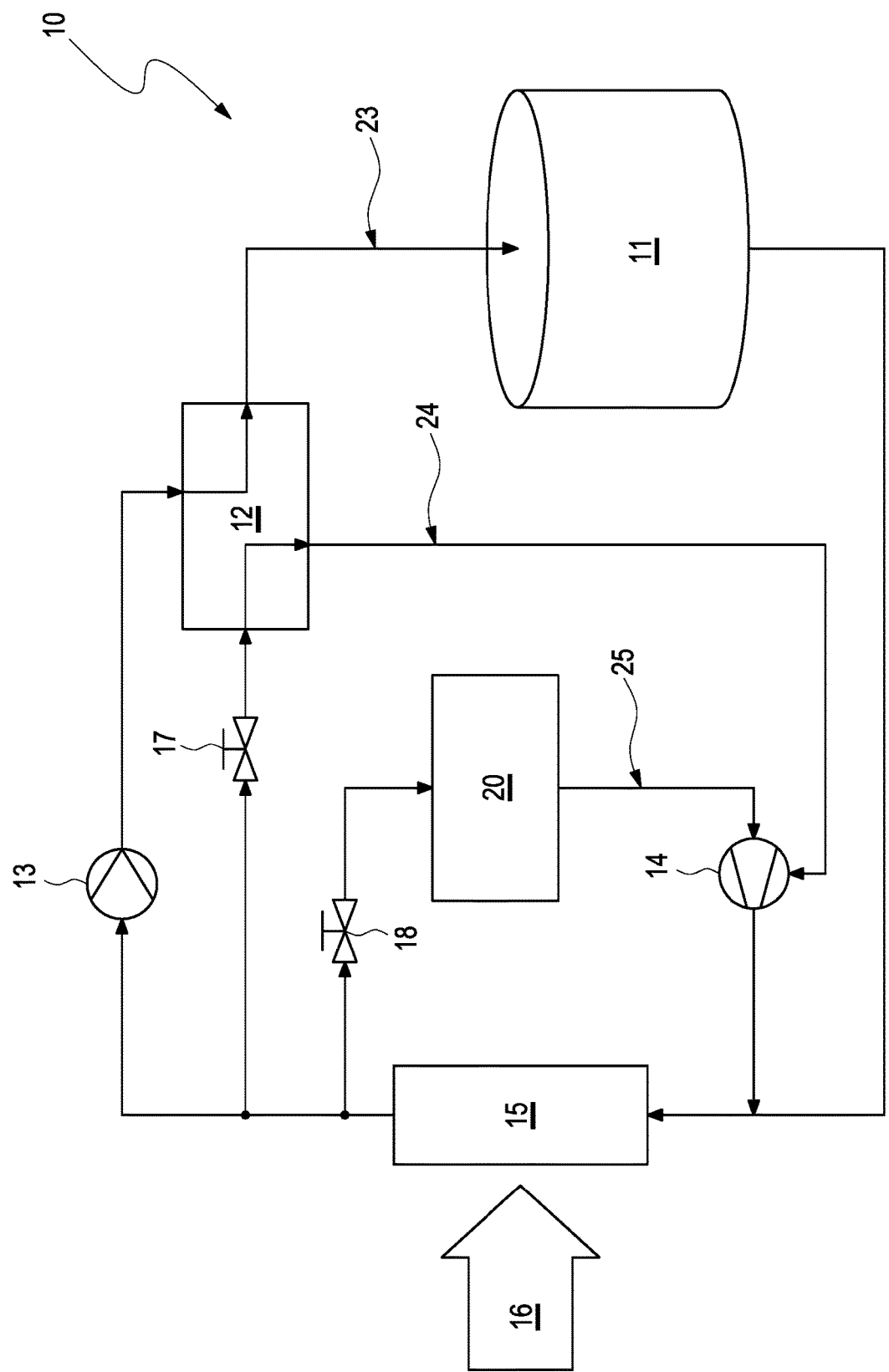
FIG. 3 illustrates a schematic representation of another embodiment of a fuel cell system.

FIG. 3 shows in a schematic representation another embodiment of the fuel cell system 10. This variant corresponds to the variant shown in FIG. 2, supplemented by a circuit 25 with an expansion valve 18 and an evaporator 20 for the cooling of the interior. Multiple evaporators are also conceivable in place of the single evaporator 20, for example, for a rear evaporator system or a battery cooling. The evaporator 20 is operated at a lower pressure level than the evaporator in the chiller 12 for the cooling of the fuel cell 11, so that the cooling of the fuel cell 11 is done with a higher suction pressure and a greater efficiency, corresponding to the higher temperature level. In the variant shown, this is realized by a compressor 14 with an intermediate pressure level.

Figure 4:
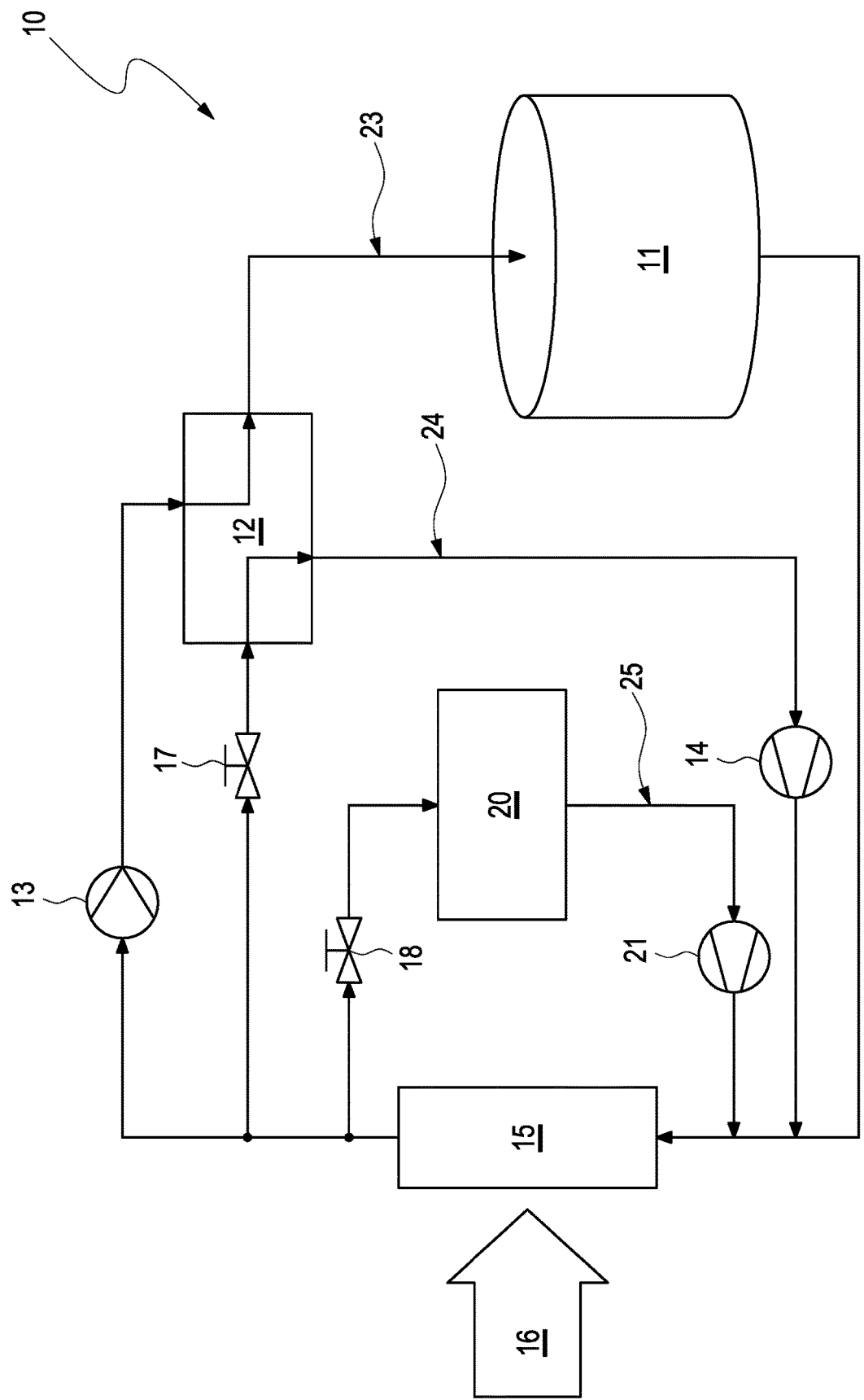
FIG. 4 illustrates a schematic representation of another embodiment of a fuel cell system.

A variant with two compressors 14 and 21 is possible, being shown in FIG. 4. The two separate compressors are connected on the pressure side and operate with a common high pressure. The cooling of the fuel cell 11 and the interior at the same pressure level is also conceivable; in this case, the evaporator 20 and chiller 12 would have a common suction line to the compressor 14. This variant is not represented in the figures, but it would use a more simple compressor, at the expense of the efficiency, and thus have a cost advantage.

Figure 5:
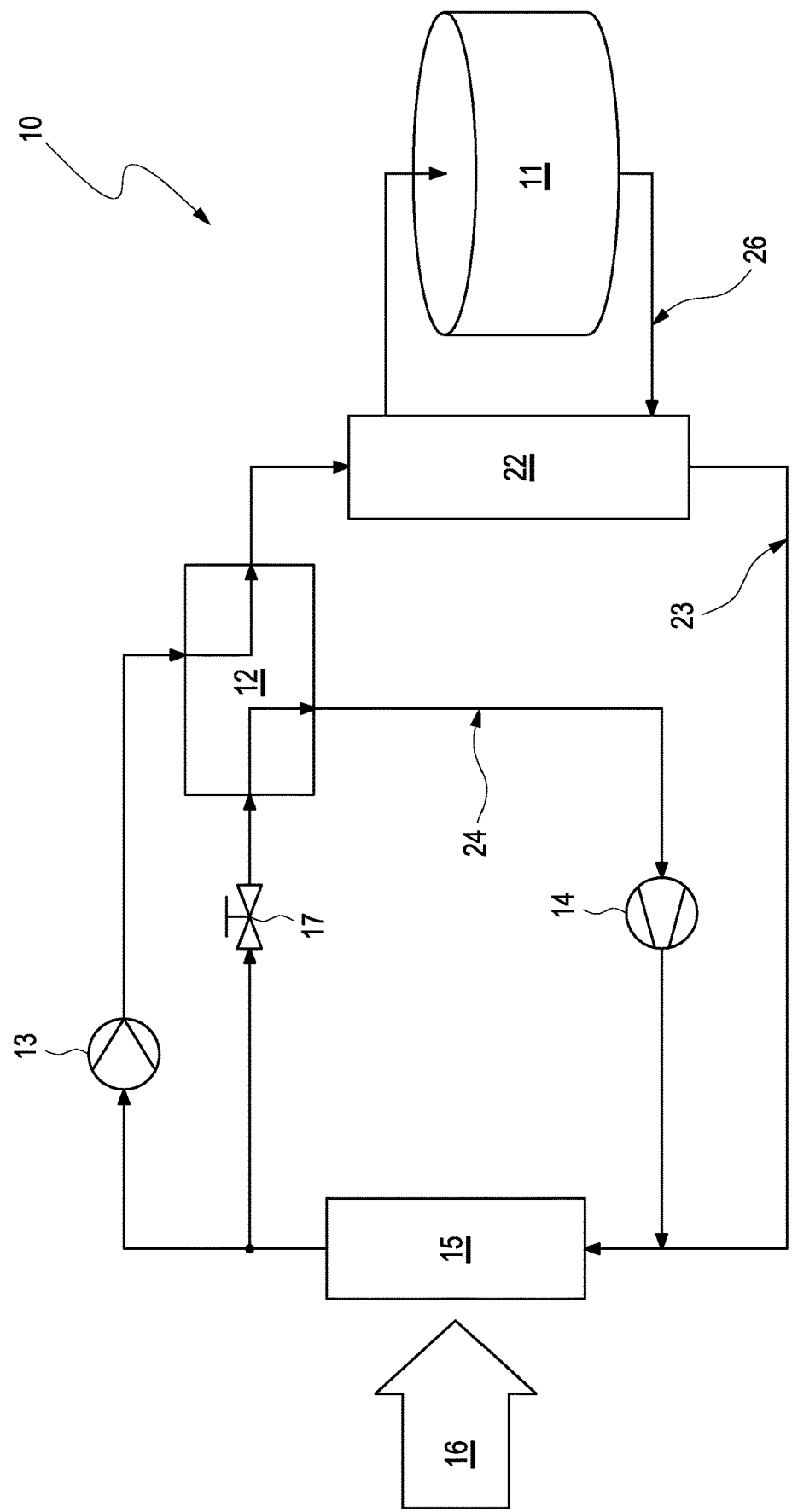
FIG. 5 illustrates a schematic representation of another embodiment of a fuel cell system having an additional secondary cooling circuit.

FIG. 5 shows in a schematic representation another embodiment of a fuel cell system 10. The variants represented in FIGS. 1 to 4 employ a direct cooling of the fuel cell 11 with the refrigerant. In the embodiment shown in FIG. 5, the fuel cell 11 is cooled by an additional secondary circuit 26. The cooling circuit 23 with the refrigerant withdraws the heat from a plate-type heat exchanger 22 (chiller), whereupon the refrigerant is at least partly evaporated. The chiller 22 is likewise part of a secondary circuit 26 with deionized water as the coolant for the fuel cell 11. The advantage in this variant is the very small cooling circuit 26 with deionized water, which can be kept free of ionic contamination without major expense, so that the conductivity of the coolant remains low and the insulation resistance of the system remains high.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A fuel cell system, comprising:
   at least one fuel cell;
   a first refrigerant circuit that extends through a refrigerant pump, a first condenser, a heat exchanger including a second condenser and an evaporator, and the at least one fuel cell; and
   a second refrigerant circuit that extends through a compressor, the first condenser, and an expansion valve,
   wherein the first refrigerant circuit is coupled by the evaporator to the second refrigerant circuit, and
   wherein the fuel cell system is adapted to evaporate a refrigerant of the first refrigerant circuit at least partly in the at least one fuel cell.

2. The fuel cell system according to claim 1, further comprising a third refrigerant circuit that extends through a second expansion valve, a second evaporator for air conditioning of a vehicle, the compressor, and the first condenser.

3. The fuel cell system according to claim 2, wherein the heat exchanger and the second evaporator have a common suction line to the compressor.

4. The fuel cell system according to claim 1, wherein the first condenser is cooled by an air flow.

5. The fuel cell system according to claim 1, wherein the first refrigerant circuit and the second refrigerant circuit circulate the same refrigerant.

6. The fuel cell system according to claim 1, wherein the at least one fuel cell comprises a secondary circuit filled with deionized water and having a second heat exchanger, wherein the second heat exchanger is coupled to the first refrigerant circuit and a refrigerant of the first refrigerant circuit is at least partly evaporated in the second heat exchanger.

7. The fuel cell system according to claim 1, wherein the heat exchanger is a plate-type heat exchanger.

* * * * *